United States Patent [19]
Koyama

[11] 3,928,526
[45] Dec. 23, 1975

[54] PROCESS FOR PRODUCING CURED PHENOLIC CONTINUOUS FILAMENTS

[75] Inventor: Hiroaki Koyama, Osaka, Japan

[73] Assignee: Nippon Kynol Inc., Osaka, Japan

[22] Filed: June 1, 1973

[21] Appl. No.: 366,096

[30] Foreign Application Priority Data
June 3, 1972  Japan................................ 47-55314

[52] U.S. Cl............. 264/236; 260/841; 264/176 F; 264/347
[51] Int. Cl.²........................................ B29C 25/00
[58] Field of Search............ 260/59 R, 57, 831, 841; 264/176 F, 236, 210 F, 347

[56] References Cited
UNITED STATES PATENTS

| | | | |
|---|---|---|---|
| 2,142,007 | 12/1938 | Schlack................................ | 264/78 |
| 2,168,335 | 8/1939 | Heckert................................ | 264/78 |
| 2,376,511 | 5/1945 | Saunders et al. ................. | 264/210 F |
| 2,378,667 | 6/1945 | Vaala................................... | 260/43 |
| 2,683,130 | 7/1954 | D'Alelio............................. | 264/206 |
| 3,363,025 | 1/1968 | Fifko et al. ......................... | 260/841 |
| 3,651,199 | 3/1972 | Blume et al. ...................... | 264/210 F |
| 3,716,521 | 2/1973 | Economy et al. ................. | 264/176 F |
| 3,723,588 | 3/1973 | Economy et al. ................. | 264/176 F |
| 3,808,289 | 4/1974 | Okuhashi et al.................... | 260/841 |

FOREIGN PATENTS OR APPLICATIONS

| | | | |
|---|---|---|---|
| 40-5927 | 3/1965 | Japan .............................. | 264/176 F |
| 44-3506 | 2/1969 | Japan .............................. | 264/176 F |

OTHER PUBLICATIONS
Alien Prop. Ser. No. 375537, Ubbelohde, 4-27-43.

Primary Examiner—Jay H. Woo
Attorney, Agent, or Firm—Sherman & Shalloway

[57] ABSTRACT

A process for producing a drawn or undrawn cured phenolic continuous filament which comprises melt-spinning an uncured novolak resin which may contain a fiber-forming thermoplastic synthetic resin in an amount of less than 30% by weight based on the total weight of the novolak resin and the thermoplastic synthetic resin and then curing the meltspun filament with an aldehyde as a curing agent in the presence of a catalyst; characterized by (a) precuring the meltspun novolak filament with the aldehyde in the presence of an acid catalyst in two or three precuring baths maintained at progressively higher temperatures and then curing the precured filament with the aldehyde in the presence of a catalyst selected from the group consisting of acid catalysts and basic catalysts, or (b) precuring the meltspun novolak filament with the aldehyde in the presence of an acid catalyst consisting of hydrochloric acid and an acid salt, and then curing the precured filament with the aldehyde in the presence of a catalyst selected from the group consisting of acid catalysts and basic catalysts.

17 Claims, No Drawings

PROCESS FOR PRODUCING CURED PHENOLIC CONTINUOUS FILAMENTS

This invention relates to an improved process for producing drawn or undrawn flame-resistant and anti-fusing cured phenolic continuous filaments having improved tenacity, elongation and luster by commercial means whose productivity is high.

Phenolic filaments have been disclosed, for example, in South African Patent No. 6,901,356. The South African patent discloses that after melt spinning filaments from an uncured novolak resin, the spun filaments are dipped in an aqueous solution of a mixture of hydrochloric acid and formaldehyde for ten or more hours, heated gradually and further boiled in an aqueous solution of a mixture of hydrochloric acid and formaldehyde, thereby curing the filaments. According to this process, the yarn properties of the resulting filaments, such as tenacity and elongation, are not fully satisfactory, and the color of the filaments is also dark brown.

There is also a proposal of imparting a high degree of elasticity to polyamide filaments, by spinning a melt blend of a polyamide resin and a fusible phenolformaldehyde resin containing the latter in an amount up to 40 % by weight of the polyamide resin to produce filaments, which are cured using an alkali curing agent (Japanese Patent Application Publication No. 5927/65 published Mar. 25, 1965). The application points out that if the amount of the phenol-formaldehyde resin exceeds 25 % by weight based on the polyamide resin, the spinnability or drawability of the resulting mixture is reduced, and adverse effects are had on the quality of the resulting filament, and in the sole Example in this application the amount of the phenol-formaldehyde resin is 10 % by weight based on nylon-6.

With a view to providing a process for producing a drawn or undrawn flame-resistant and anti-fusing cured phenolic continuous filament having a light-colored appearance, good dyeability and improved yarn properties such as tenacity and elongation by a shortened curing period, I previously proposed a process which comprises melt-spinning an uncured novolak resin, which may contain a fiber-forming thermoplastic synthetic resin in an amount of less than 40% by weight based on the total weight of the novolak resin and the thermoplastic synthetic resin, precuring the melt-spun filament with an aldehyde as a curing agent in the presence of an acid catalyst, and then curing the precured filament with an aldehyde in the presence of a basic catalyst. (U.S. patent application Ser. No. 302,010).

In consequence of further researches with a view to providing a still more improved process by which flame-resistant and anti-fusing cured phenolic continuous filaments having still more improved tenacity, elongation and luster could be produced with good quality reproducibility and much more improved productivity, I found that these improvements could be achieved by operating in the following manner: i.e., by using two or three precuring baths maintained at progressively higher temperatures and precuring the melt-spun novolak filament with an aldehyde in these baths in the presence of an acid catalyst or by precuring the foregoing filament with an aldehyde in the presence of an acid catalyst consisting of hydrochloric acid and an acid salt, and thereafter curing the so precured filament with an aldehyde as the curing agent in the presence of a catalyst selected from the group consisting of the acid and basic catalysts. In addition, it was found that the use of the foregoing acid catalyst consisting of hydrochloric acid and an acid salt not only aided in the achievement of the foregoing improvements but also provided a cured phenolic filament having self-crimpability.

Accordingly, the object of the present invention is to provide an improved process for producing a melt-spun drawn or undrawn cured phenolic continuous filament having excellent flame-resistant and anti-fusing properties, and the other improved yarn properties such as tenacity, elongation and luster by a simple and time-saving operation with excellent productivity and quality reproducibility.

Many other objects and advantages of this invention will become apparent from the following description.

According to this invention, the uncured novolak resin, which may contain a fiber-forming thermoplastic synthetic resin, is melt-spun and then cured by a two-step process comprising the precuring step which consists of two or three stages with an acid catalyst, or the precuring step with an acid catalyst and acid salt, followed by the curing step with an acid catalyst or a basic catalyst.

The novolak resin is a resin which is uncured and fusible in the starting molten mixture, and can be cured with a curing agent after melt-spinning. The method of preparing the novolak resin itself is well known. It can be produced by heat reacting (polycondensing) a phenol with an aldehyde in the presence of an acid catalyst. Usually, the novolak resins have a number average molecular weight of about 300 to about 2000. If desired, those having a larger molecular weight (for example, up to about 5000) can be produced. Therefore, as is well known, the predominantly novolak-type modified novolak resins obtained by any desired combination of the novolak-type reaction and the resol-type reaction can also be used. Furthermore, any desired combinations of phenols and aldehydes can be used, and different novolak resins each derived from a different combination of phenol and aldehyde can be used conjointly.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these.

The aldehyde most commonly used for polycondensation with the above phenol is formaldehyde, but paraformaldehyde, benzaldehyde, hexamethylenetetramine, furfural and a mixture thereof can also be utilized. These aldehydes may be used as the precuring agent, as well as the curing agent in this invention.

The acid catalyst used for the reaction of forming the novolak resins may be any of the known organic or inorganic acids, for example, hydrochloric acid, nitric acid, sulfuric acid, phosphoric acid, formic acid, acetic acid, oxalic acid or phthalic acid.

In this invention, the uncured novolak resin can be melt-spun alone or in admixture with a fiber-forming thermoplastic synthetic resin. The thermoplastic synthetic resin may be added to the novolak resin in an amount of less than 30 % by weight, for example, 0.1 to 30 % by weight based on the total amount of the resin.

As the thermoplastic synthetic resin, polyamides, such as nylon-6, nylon-7, nylon-9, nylon-11, nylon-12, nylon-66, nylon-610, nylon-611, nylon-612, nylon-6T represented by the general formula

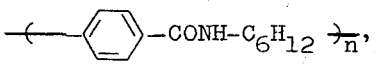

or nylon-11T represented by the general formula

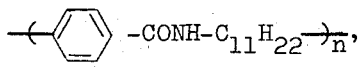

and copolymers consisting essentially of these polyamides; polyesters, such as polymethylene terephthalate, polyethylene terephthalate, polybutylene terephthalate, polyethylene oxyterephthalate, polycyclohexylene terephthalate and the like, and copolymers consisting essentially of these polyesters; polyolefins, such as polyethylene, polypropylene, polystyrene, polyvinylidene chloride, polyvinyl chloride and the like, and copolymers thereof; and various polyurethanes may be used. These thermoplastic polymers may be used in admixture.

According to this invention, the uncured melt-spun filaments obtained by melt-spining an uncured novolak resin, which may contain a fiber-forming thermoplastic synthetic resin, are precured with an aldehyde as the curing agent in the presence of an acid catalyst in two or three precuring baths maintained at progressively higher temperatures, or the filaments are precured with the aldehyde in the presence of an acid catalyst and an acid salt.

In the former mode, the precuring of the melt-spun filament may usually be performed at a temperature from about 15° to 85°C. The temperature can be suitably chosen within the above-mentioned range according to the type and amount of the novolak resin, the type and amount of the thermoplastic synthetic resin, the denier of the filament, the way in which the precuring is performed, the type and amount of the curing agent, etc.

In the most usually practiced mode, the melt-spun filament is immersed in or run through, two or three baths containing an aldehyde as the curing agent in the presence of an acid catalyst. For example, the filaments are treated in an aqueous solution of a first bath containing a mixture of an acid catalyst and an aldehyde for 10 to 60 minutes at a temperature ranging from about 35° to 45°C. and then in an aqueous solution of a second bath containing a mixture of an acid catalyst and an aldehyde for 10 to 60 minutes at a temperature ranging from about 65° to 75°C. In another mode, the filaments are treated in the aqueous solution of the first bath containing a mixture of an acid catalyst and an aldehyde for 10 to 60 minutes at a temperature ranging from about 20° to 40°C., then in the aqueous solution of the second bath containing a mixture of an acid catalyst and an aldehyde for 10 to 60 minutes at a temperature ranging from about 50° to 60°C., and further in an aqueous solution of a third bath containing a mixture of the same for 10 to 60 minutes at a temperature of from about 70° to 80°C.

One example of the aqueous solution of the mixture of the aldehyde and acid catalyst is an aqueous solution containing 6 to 40 % by weight, preferably 12 to 25 % by weight, of the acid and 6 to 40 % by weight, preferably 12 to 25 % by weight of the aldehyde.

In the latter mode, the precuring of the melt-spun filament may be performed by the one-bath method using a bath containing an aqueous solution of a mixture consisting of about 6 to 40 % by weight, preferably about 8 to 14 % by weight, of hydrochloric acid, about 0.5 to 20 % by weight, preferably about 1 to 15 % by weight, and more preferably about 3 to 10 % by weight, of an acid salt, and about 6 to 40 % by weight, preferably about 8 to 30 % by weight of an aldehyde. For example, the melt-spun filaments are immersed in the aqueous solution of the bath containing the above mentioned mixture at a temperature of below 45°C. and then the solution is gradually heated up to about 80°C to 105°C. during about 0.5 to 5 hours.

When the rate at which the temperature is raised is higher than 200°C. per hour, the filament becomes dissolved or sticky. Therefore, the temperature should not be raised at a rate higher than 200°C. per hour. Preferably, the rate of raise should be 20° – 200°C. per hour, more preferably 40° – 160°C. per hour, and especially 80° – 105°C. A cured novolak filament possessing especially excellent self-crimpability is provided by this latter mode. In this later mode, the acid salt to be used conjointly with the hydrochloric acid is an inorganic salt consisting of a strong acid and a weak base and must be one which is soluble in the aqueous solution containing the acid catalyst and the aldehyde.

The acid salt can be used as precuring catalyst together with the acid catalyst in the former mode.

The aldehyde that is most commonly used is formaldehyde, but paraformaldehyde, benzaldehyde, hexamethylenetetramine, furfural and a mixture therefore may also be utilized.

The acid catalyst used in the present invention may be any known inorganic and organic acid, such as hydrochloric acid, sulfuric acid, nitric acid, acetic acid, oxalic acid, formic acid, orthophosphoric acid, butyric acid, lactic acid, benzenesulfonic acid, p-toluensulfonic acid or boric acid. Mixtures of these acids may also be used.

The acid salt used in the present invention includes, for example, zinc chloride, ammonium chloride, tin chlorides, antimony fluoride, ammonium sulfate, zinc sulfate, zinc acetate and the like. Mixtures of these acid salt may also be used.

The precured or partially cured filament as described above is then cured with an aldehyde, as the curing agent as described before, in the presence of a catalyst selected from the group consisting of the acid and basic catalysts. As examples of these acid catalysts, included are those which are the same as those used in the precuring step, and they can be the same as or different from those, used therein.

The basic catalyst used in the present invention may be ammonia, ammonium hydroxide, and the amines, for example, monoethanolamine, triethyleneamine, a hydroxide or carbonate of a metal selected from the group consisting of the alkali metals and alkaline earth metals, for example, sodium hydroxide, potassium hydroxide, calcium hydroxide, barium hydroxide, or sodium carbonate, and mixtures thereof. Hexamethylenetetramine can be used not only as the curing agent but also as the basic catalyst.

The curing of the precured or partially cured filament is usually effected by contacting the filament with a mixture of the aldehyde and acid catalyst and/or basic catalyst in the form of an aqueous solution, fume or vapor.

When this treatment is carried out by using the mixture in the form of an aqueous solution, the precured filament is immersed in or run through a bath containing the aldehyde and acid catalyst and/or basic catalyst.

For example, the precured filament is treated with an aqueous solution of a mixture of the acid catalyst and the aldehyde for about 1 to 10 hours at a temperature ranging from about 85° to 105°C. In another mode, the precured filament is treated with an aqueous solution of a mixture of the acid catalyst and the aldehyde for about 5 to 30 minutes at a temperature ranging from about 85° to 105°C., and then the filament is treated with an aqueous solution of a mixture of the basic catalyst and the aldehyde for about 15 to 90 minutes at a temperature ranging from about 60° to 105°C. Alternatively, the precured filament is treated with an aqueous solution of a mixture of the basic catalyst and the aldehyde for about 15 to 90 minutes at a temperature ranging from about 60° to 105°C., said mixture containing about 0.2 – 20 % by weight of the basic catalyst and about 1 – 60 % by weight of the aldehyde. In the first and the second modes, the mixtures contain the catalyst and the aldehyde in same amounts as described in the case of the mixture used in the precuring step.

The filament obtained by the invention process can be further treated with a lower alcohol, acetone and the aqueous solutions thereof or dilute ammonia water and aqueous alkaline solutions for improving the elongation of the filament. Again, the filament can be drawn by means of various methods for obtaining a high tenacity filament.

After completion of the cure, the cured filaments are washed with water and may be dried at 50° – 100°C. for 20 – 60 minutes.

The melt-spinning apparatus and operation are well known. Hence, their description will be omitted in this specification.

The known treatments, such as filtration or defoaming, of the molten mixture can be performed at any time before the molten mixture reaches the spinneret. The spun filament can be cured after its windup or at any time before its windup. The windup rate is usually 200 to 2500 meters per minute. Usually, windup rates somewhat faster than the spinning speed give favorable effects to the tenacity of the resulting filament.

Known oils or n-paraffinic hydrocarbons, etc., can be utilized as spinning oil preparations.

The melt-spun filament can be drawn at any desired time before and/or after curing. The drawing often results in desirable properties of the filament.

The drawing operation may be conducted in one or more stages, and the filament can be either cold or hot drawn. In the case of a multi-stage drawing, cold drawing and hot drawing can be optionally combined. The draw ratio is also optional, and a ratio usually up to 2.5 based on the length of the undrawn filament may be employed.

The resulting continuous filaments of this invention can not only be directly used in the form of monofilaments, multifilaments or tows but can also be used in the form of fibers cut to the desired lengths. Or they can be used as spun yarns either alone or in admixture with other known filaments or fibers, or in the form of twisted yarns or the like. It can also be made into various filamentary structures such as knit or woven fabrics or non-woven fabrics either alone or in admixture with known filaments. Accordingly, the present invention includes within its scope a filamentary structure in a form selected from the group consisting of fibers, yarns, knit fabrics, woven fabrics, non-woven fabrics, felt or carpets or the like, which contain or consist of a filamentary material derived from the melt-spun drawn or undrawn flame-resistant and anti-fusing cured phenolic continuous filament comprising a novolak resin which may contain a fiber-forming thermoplastic synthetic resin, as hereinabove described.

The melt-spun drawn or undrawn flame-resistant and anti-fusing cured phenolic continuous filament has superior flame-resistant and anti-fusing properties, and has improved yarn properties such as tenacity, elongation and luster. This filament can be produced with improved productivity and quality reproducibility, without the undesirable phenomena such as sticking and dissolution of filaments which may occur during the precuring or curing step.

The invention will be illustrated further by the following Examples together with controls. Tenacity (strength) and elongation were measured by JIS Method L-1074.

EXAMPLES 1 AND 2 AND CONTROLS 1, 2 AND 3

A novolak resin of a number average molecular weight of 1030 was melt-spun at 160°C. from a spinneret having 50 holes each 0.5 mm in diameter, following which the spun filaments were wound up at a speed of 1200 meters per minute. The resulting filaments of 2.9 denier had a tenacity of 0.17 g/d and an elongation of 0.7 %.

The so obtained spun filaments were precured by the following procedures using a combined aqueous solution consisting of 15 weight % of hydrochloric acid and 18 weight % of formaldehyde.
1. Immersion for 120 minutes in the foregoing combined aqueous solution of 47° – 48°C. (Control 1).
2. Immersion for 20 minutes in the foregoing combined aqueous solution of 42° – 43°C. followed by immersion for 15 minutes in the same solution of 72° – 73°C. (Example 1).
3. Precuring by immersion for 20 minuts in the foregoing combined aqueous solution of 30° – 31°C., followed by 20 minutes in the same solution of 55° – 56°C., and thereafter 10 minutes in the same solution of 75° – 76°C. (Example 2).
4. Precuring by immersion for 15 minutes in the foregoing combined aqueous solution of 23° – 24°C., followed by 15 minutes in the same solution of 40° – 42°C., then 15 minutes in the same solution of 60° – 62°C., and thereafter 10 minutes in the same solution of 78° – 80°C. (Control 2).
5. Immersion in the foregoing combined aqueous solution of 20°C. followed by immediately raising the temperature up to 95°C. during a period of 60 minutes. (Control 3).

The precured filaments obtained by the foregoing procedures (1) – (5) were then cured by immersion for 15 minutes at 95°C. in the foregoing combined aqueous solution of hydrochloric acid and formaldehyde and further cured for 30 minutes at 90°C. in a combined aqueous solution consisting of 40 weight % of ammonia and 30 weight % of formaldehyde, followed by water-washing and further treatment for 30 minutes at 60°C. with a 60 weight % aqueous methanol solution.

In Table 1 are shown in the tenacities and elongations as well as lusters of the so obtained phenolic filaments.

Table 1

| Experiment No. | Precuring procedure | Tenacity (g/d) | Elongation (%) | Luster |
|---|---|---|---|---|
| Control 1 | (1) | 1.31 | 58 | satisfactory |
| Example 1 | (2) | 1.36 | 65 | satisfactory |
| Example 2 | (3) | 1.32 | 67 | satisfactory |
| Control 2 | (4) | 1.33 | 62 | slightly devitrified |
| Control 3 | (5) | 1.21 | 56 | devitrified |

As is apparent from Table 1, the phenolic filaments obtained by the invention process has an elongation that is improved over that of the filaments of the conventional methods, and their luster is also excellent.

In the case of Control 1, a prolonged precuring period is required for preventing the agglutination of the filaments. On the other hand, in the case of Controls 2 and 3, the process becomes complicated and, in addition, difficulty is experienced in obtaining filaments excelling in luster.

EXAMPLE 3

A melt blend of 90 weight % of the same novolak resin as that used in Example 1 and 10 weight % of a powder of nylon-12 was melt-spun at 170°C. from a spinneret having 40 holes each 0.7 mm in diameter, following which the spun filaments were wound up at a speed of 1500 meters per minute. The spun filaments of 2.7 denier had a tenacity of 0.21 g/d and an elongation of 1.5 %.

The foregoing spun filaments were then precured by immersing the filaments for 30 minutes at 43°C. in a combined aqueous solution consisting of 15 weight % of hydrochloric acid, 1.5 weight % of methanol and 15 weight % of formaldehyde followed immediately by reacting the filaments for 20 minutes in a 72°C. combined aqueous solution of the same composition as the foregoing combined aqueous solution. The so precured filaments were then cured by immersion for 10 minutes in a combined aqueous solution of 82° - 110°C. consisting of 10 weight % of hydrochloric acid, 10 weight % of sulfuric acid and 20 weight % of formaldehyde.

The so obtained filaments were then cured by reacting for a further 60 minutes at 93°C. in a curing bath prepared using hexamethylenetetramine and paraformaldehyde such that the content of ammonia becomes 3.3 weight % and that of formaldehyde becomes 25 weight %. Next, the filaments were treated for 2 hours at 70°C. in a 10 weight % aqueous sodium carbonate solution.

In Table 2 are shown the temperatures at which the reactions were carried out with the aforesaid combined solution consisting of hydrochloric acid, sulfuric acid and formaldehydes and in each case the denier, tenacity and alongation of the finally obtained filaments.

Table 2

| Temperature (°C) | Denier (d) | Tenacity (g/d) | Elongation (%) |
|---|---|---|---|
| 82 | 2.7 | 1.08 | 19 |

Table 2-continued

| Temperature (°C) | Denier (d) | Tenacity (g/d) | Elongation (%) |
|---|---|---|---|
| 85 | 2.8 | 1.22 | 38 |
| 90 | 2.9 | 1.36 | 44 |
| 95 | 2.9 | 1.43 | 42 |
| 100 | 2.8 | 1.39 | 46 |
| 105 | 2.7 | 1.41 | 40 |
| 110 | | Partial agglutination | |

As is apparent from Table 2, filaments excelling in tenacity and elongation are obtained when the temperature of the precuring bath was 85° - 105°C. but, on the other hand, at 82°C. there was not only a great drop in the elongation, but there was also noted partial agglutination of the filaments when they were immersed in the 93°C. combined aqueous solution of ammonia and formaldehyde.

On the other hand, difficulty was experienced in maintaining the curing bath at normal pressure at 110°C. And moreover there was partial agglutination of the filaments that had been precured in advance for 20 minutes at 72°C.

For showing the smallness of the caloric requirement of the invention process, the following experiment was carried out.

A one cubic meter tank of fiber reinforced plastic was filled with a combined aqueous solution (specific gravity = 1.15, specific heat = 0.74) consisting of 16 weight % of hydrochloric acid and 20 weight % of formaldehyde, after which the temperature of this solution was raised from 20°C. to 95°C. during a 60-minute period with steam of 3.2 kg/cm². After the indicated temperature was reached, it was immediately cooled to 20°C. with cold water of 5°C. during a 60-minute period.

Separately, one cubic meter of the foregoing combined aqueous solution was held for 2 hours at the several temperatures of 30°, 40°, 50°, 70° and 90°C.

In Table 3 are shown the caloric requirements in the case where the temperature of the solution was raised and cooled and the case where the solution was held at the several temperatures.

The caloric requirement was calculated as follows:
$$Q = (V \times 60/t)(\rho)(C_P)(T - T_o)$$
where:

$Q$ is caloric requirement (Kcal/hr)
$V$ is the amount of the mixed solution (m³)
$t$ is the time required for heating the mixed solution (min)
$\rho$ is specific gravity
$C_p$ is specific heat (Kcal/Kg.°C)
$T$ is temperature required (°C)
$T_o$ is room temperature (°C)

Table 3

| No. | Procedure | Caloric requirement (Kcal/hour) |
|---|---|---|
| (1) | Temperature raised from 20° to 95°C. | $6.4 \times 10^4$ |
| (2) | Temperature cooled from 95° to 20°C. | $6.4 \times 10^4$ |
| (3) | Temperature held for 2 hours at 30°C. | $0.085 \times 10^4$ |
| (4) | Temperature held for 2 hours at 40°C. | $0.15 \times 10^4$ |
| (5) | Temperature held for 2 hours at 50°C. | $0.18 \times 10^4$ |
| (6) | Temperature held for 2 hours at 70°C. | $0.22 \times 10^4$ |
| (7) | Temperature held for 2 hours at 95°C. | $0.28 \times 10^4$ |

As is apparent from Table 3, while the caloric requirement is very small in the case of Experiments Nos.

(3) – (7), which pertain to the invention process, the caloric requirement in the case of Experiments Nos. (1) and (2), which pertain to the conventional methods, is great.

EXAMPLE 4

A novolak resin of a number average molecular weight of 960 was melt-spun at 160°C., using a spinneret having 50 holes each 0.3 mm in diameter, and the spun filaments were wound up at a speed of 1000 meters per minute to obtain filaments of 3.1 denier having a tenacity of 0.15 g/d and an elongation of 0.8 %. The so obtained spun filaments were immersed at 15°C. in combined aqueous solutions containing hydrochloric acid in varying concentrations of 2 – 16 weight %, along with 5 weight % of zinc chloride and 16 weight % of formaldehyde, after which the temperature of the solutions were raised up to 95°C. during a period of 50 minutes. Next, the so precured filaments were cured by reacting for 30 minutes at 90°C. in a combined aqueous solution prepared, using hexameththylenetetramine and paraformaldehyde and containing ammonia in an amount of 5.0 weight % and formaldehyde in an amount of 35 weight %. The so cured filaments were then treated for 30 minutes at 60°C. in an 80 weight % aqueous methanol solution.

In Table 4 are shown the concentrations of the hydrochloric acid and the number of crimps per 25 mm, the rate of crimp, and the tenacity and elongation of the respective filaments obtained as a result of having been precured in solutions containing hydrochloric acid in varying concentrations.

Table 4

| HCl concentration (wt %) | Number of crimps (crimps/ 25 mm) | Rate of crimp (%) | Tenacity (g/d) | Elongation (%) |
|---|---|---|---|---|
| 2.0 | 38 | 20 | 0.81 | 9 |
| 4.0 | 24 | 30 | 1.07 | 47 |
| 8.0 | 21 | 26 | 1.26 | 56 |
| 14.0 | 17 | 18 | 1.33 | 68 |
| 16.0 | 9 | 10 | 1.31 | 65 |

As is apparent from Table 4, while it is possible to obtain phenolic filaments excelling in tenacity and elongation and having satisfactory crimps when the concentration of the hydrochloric acid was 4.0 – 16.0 weight %, it is seen that a great drop in the tenacity and elongation of the filament took place when the concentration of the hydrochloric acid was 2.0 weight %.

EXAMPLE 5

A novolak resin whose molar ratio of phenol to p-cresol is 8:2 and of a number average molecular weight of 830 was melt-spun at 155°C. from a spinneret having 30 holes each 2.5 mm in diameter, and the spun filaments were wound up at a speed of 300 meters per minute to obtain filaments of 3.0 denier having a tenacity of 0.15 g/d and an elongation of 0.9 %.

The foregoing spun filaments were precured by immersing them at 20°C. in combined solutions consisting of 3 weight % of antimony fluoride, 12 weight % of hydrochloric acid and 15 weight % of formaldehyde, after which the temperatures of the solutions were raised up to 94°C. at rates varying from 10° to 250°C. per hour, and thereafter the reaction was carried out for a further 10 hours at 93° – 95°C.

Next, the foregoing filaments were cured for 3 hours at 80°C. in a 2 weight % aqueous ammonia solution.

In Table 5 are shown the rates of temperature raise per hour and the denier, number of crimps, rate of crimp and the tenacity and elongation of the filaments obtained by varying the rate at which the temperature of the precuring solution was raised.

Table 5

| Rate of temperature raise (°C/hour) | Denier (d) | Number of crimps (crimps /25mm) | Rate of crimp (%) | Tenacity (g/d) | Elongation (%) |
|---|---|---|---|---|---|
| 10 | 2.8 | 1 | 2 | 1.33 | 28 |
| 20 | 2.7 | 7 | 10 | 1.39 | 31 |
| 40 | 2.9 | 8 | 10 | 1.40 | 36 |
| 60 | 3.0 | 11 | 11 | 1.26 | 41 |
| 80 | 3.2 | 14 | 14 | 1.38 | 49 |
| 120 | 3.1 | 14 | 13 | 1.35 | 50 |
| 160 | 3.0 | 16 | 13 | 1.19 | 37 |
| 200 | 3.1 | 18 | 18 | 1.01 | 19 |
| 250 | — | 21 | 9 | — | — |

As is apparent from Table 5, filaments excelling in crimpability, tenacity and elongation were obtained when the rate of temperature raise ranged from 20° –200°C. On the other hand, crimps did not develop fully when the rate of temperature raise was 10°C. per hour, while at 250°C. agglutination of the filaments took place, with the consequence that serviceable filaments could not be obtained.

EXAMPLE 6

A novolak resin of number average molecular weight of 960 was melt blended severally with 1, 5, 10, 20, 30 and 50 weight % of nylon-6, and using the two resins having the foregoing mixture compositions filaments were spun from a composite spinneret having eight holes each 1.0 mm in diameter and of a joint ratio of 1:1, after which the filaments were wound up at a speed of 500 meters per minute. The spun filaments of 3.5 denier had tenacities of 0.17 – 0.78 g/d and elongations of 0.5 – 15 %.

The foregoing filaments were then immersed at 30°C. in either a combined aqueous solution A consisting of 15 weight % of hydrochloric acid and 17 weight % of formaldehyde (Control) or a combined aqueous solution B consisting of 15 weight % of hydrochloric acid, 17 weight % of formaldehyde and 5 weight % of stannic chloride, following which the temperature of the solution was raised up to 95°C. during a period of 70 minutes.

The so obtained precured filaments, after washing in water, were cured by reacting for 30 minutes at 90°C. in an aqueous solution consisting of 4 weight % of ammonia, 15 weight % of formaldehyde and 15 weight % of benzaldehyde.

Next, the filaments were treated for 30 minutes at 50°C. with 100 weight % methanol and thereafter water-washed and dried.

In Table 6 are shown the ratios in which nylon-6 was mixed in the several composite 2-component filaments, the class of the precuring bath (whether A or B), the number of crimps and the limit of inflammability index (L.O.I.) as measured with the flammability tester (manufactured by the Toyo Rika Kogyo Co., Ltd., Japan) of knit fabrics made from these phenolic filaments as well as their bulkiness. In this case, when the fabric burns continuously in air, its L.O.I. is about 21.

Table 6

| Mixture ratio of nylon-6 (wt. %) | Pre-curing bath | Number of crimps (crimps/ 25 mm) | L.O.I. | Nonflam-mability | Bulki-ness (cm) |
|---|---|---|---|---|---|
| 1 | 5 | A | 1 | 33 | good | 9.1 |
| 1 | 5 | B | 15 | 33 | good | 12.6 |
| 1 | 10 | A | 3 | 30 | good | 9.3 |
| 1 | 10 | B | 23 | 31 | good | 13.8 |
| 1 | 20 | A | 6 | 26 | good | 10.1 |
| 1 | 20 | B | 29 | 27 | good | 13.9 |
| 1 | 30 | A | 10 | 19 | poor | 10.3 |
| 1 | 30 | B | 36 | 19 | poor | 14.1 |
| 1 | 50 | A | 18 | 18 | poor | 11.6 |
| 1 | 50 | B | 54 | 18 | poor | 15.5 |
| 5 | 10 | A | 4 | 28 | good | 9.3 |
| 5 | 10 | B | 24 | 29 | good | 13.1 |
| 5 | 20 | A | 3 | 21 | fair | 9.4 |
| 5 | 20 | B | 19 | 22 | fair | 12.9 |
| 5 | 30 | A | 7 | 19 | poor | 10.5 |
| 5 | 30 | B | 31 | 19 | poor | 14.0 |
| 5 | 50 | A | 17 | 16 | poor | 12.7 |
| 5 | 50 | B | 39 | 17 | poor | 14.3 |

As can be seen from Table 6, when the ratio in which the nylon-6 was blended was great, crimps were developed even when solution A was used as the precuring bath, but in such a case the L.O.I. of the filament was low. Hence, it was flammable. On the other hand, when solution B was used as the precuring bath, satisfactory crimpability was obtained even in the case where the ratio in which the nylon was blended was small. In addition, the L.O.I. was high and yarn excelling in bulkiness was obtained.

What is claimed is:

1. A process for producing a drawn or undrawn cured phenolic continuous filament which comprises melt-spinning an uncured novolak resin which may contain a fiber-forming thermoplastic synthetic resin selected from the group consisting of nylon resin and polyurethane resin in an amount of less than 30 % by weight based on the total weight of the novolak resin and the thermoplastic synthetic resin and then curing the melt-spun filament with an aldehyde as a curing agent in the presence of a catalyst; said novolak resin produced by the reaction of a phenol selected from the group consisting of phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol and mixtures thereof and an aldehyde selected from the group consisting of formaldehyde, paraformaldehyde, benzaldehyde, hexamethylenetetramine, furfural and mixtures thereof; characterized by precuring the melt-spun novolak filament with the aldehyde in the presence of an acid catalyst in two or three precuring baths maintained at progressively higher temperatures and then curing the precured filament with the aldehyde in the presence of a catalyst selected from the group consisting of acid catalysts and basic catalysts.

2. The process according to claim 1, wherein the precuring is carried out with an aqueous solution containing 6 to 40 % by weight of the acid catalyst and 6 to 40 % by weight of the aldehyde in two or three precuring baths maintained at progressively higher temperatures ranging from about 15° to 85°C.

3. The process according to claim 2, wherein the melt-spun novolak filament is precured in an aqueous solution of a first bath containing a mixture of the acid catalyst and the aldehyde for 10 to 60 minutes at a temperature ranging from about 35° to 45°C. and then in an aqueous solution of a second bath containing a mixture of the same components for 10 to 60 minutes at a temperature ranging from about 65° to 75°C.

4. The process according to claim 2, wherein the melt-spun novolak filament is precured in an aqueous solution of a first bath containing a mixture of the acid catalyst and the aldehyde for 10 to 60 minutes at a temperature ranging from about 20° to 40°C., and then in an aqueous solution of a second bath containing a mixture of the same components for 10 to 60 minutes at a temperature ranging from about 50° to 60°C., and further in an aqueous solution of a third bath containing a mixture of the same components for 10 to 60 minutes at a temperature of from about 70° to 80°C.

5. The process according to claim 1, wherein the acid catalyst is selected from the group consisting of hydrochloric acid, sulfuric acid, nitric acid, acetic acid, oxalic acid, formic acid, orthophosphoric acid, butyric acid, lactic acid, benzenesulfonic acid, p-toluensulfonic acid, boric acid and mixtures thereof.

6. The process according to claim 1, wherein the basic catalyst is selected from the group consisting of ammonia, ammonium hydroxide, amines, hydroxides of alkali metals, hydroxides of alkaline earth metals, carbonates of alkali metals, carbonates of alkaline earth metals and mixtures thereof.

7. The process according to claim 1, wherein the aldehyde is selected from the group consisting of formaldehyde, paraformaldehyde, benzaldehyde, hexamethylenetetramine, furfural and mixtures thereof.

8. The process of claim 1 wherein said nylon resin is selected from the group consisting of polycaproamide, poly-ω-aminoheptanoic acid, poly-ω-aminononanoic acid, polyundecaneamide, polydodecaneamide, polyhexamethylene adipamide, polyhexamethylene sebacamide, polyhexamethylene undecaneamide, polyhexamethylene dodecaneamide and copolyamides thereof.

9. The process of claim 3 wherein each of said first and second precuring baths comprises an aqueous solution containing 12 to 25 percent by weight of the acid catalyst and 12 to 25 percent by weight of the aldehyde.

10. The process of claim 4 wherein each of said first, second and third precuring baths comprises an aqueous solution containing 12 to 25 percent by weight of the acid catalyst and 12 to 25 percent by weight of the aldehyde.

11. The process of claim 1 wherein said precured filament is cured with an aqueous solution of a mixture of the acid catalyst and the aldehyde for about 1 - 10 hours at a temperature ranging from 85° to 105°C.

12. The process of claim 1 wherein said precured filament is cured with an aqueous solution of a mixture of the acid catalyst and the aldehyde for about 5 - 30 minutes at a temperature ranging from about 85° to 105°C., and then with an aqueous solution of a mixture of the basic catalyst and the aldehyde for about 15 — 90 minutes at a temperature ranging from about 60° to 105°C.

13. The process of claim 1 wherein said precured filament is cured with an aqueous solution of a mixture of the basic catalyst and the aldehyde for about 15 — 90 minutes at a temperature ranging from about 60° to 105°C., said mixture containing about 0.2 - 20 % by weight of the basic catalyst and about 1 - 60 % by weight of the aldehyde.

14. The process of claim 11 wherein said aqueous curing mixture contains 6 – 40 % by weight of the acid catalyst and 6 – 40 % by weight of the aldehyde.

15. The process of claim 11 wherein said aqueous curing mixture contains 12 – 25 % by weight of the acid catalyst and 12 – 25 % by weight of the aldehyde.

16. The process of claim 12 wherein each of said aqueous curing mixtures contains 6 – 40 % by weight of the acid catalyst and 6 – 40 % by weight of the aldehyde.

17. The process of claim 12 wherein each of said aqueous curing mixtures contains 12 – 25 % by weight of the acid catalyst and 12 – 25 % by weight of the aldehyde.

* * * * *